(No Model.)
J. F. CUNNINGHAM, Sr.
Machine for Cleaning Cotton.
No. 236,700.          Patented Jan. 18, 1881.
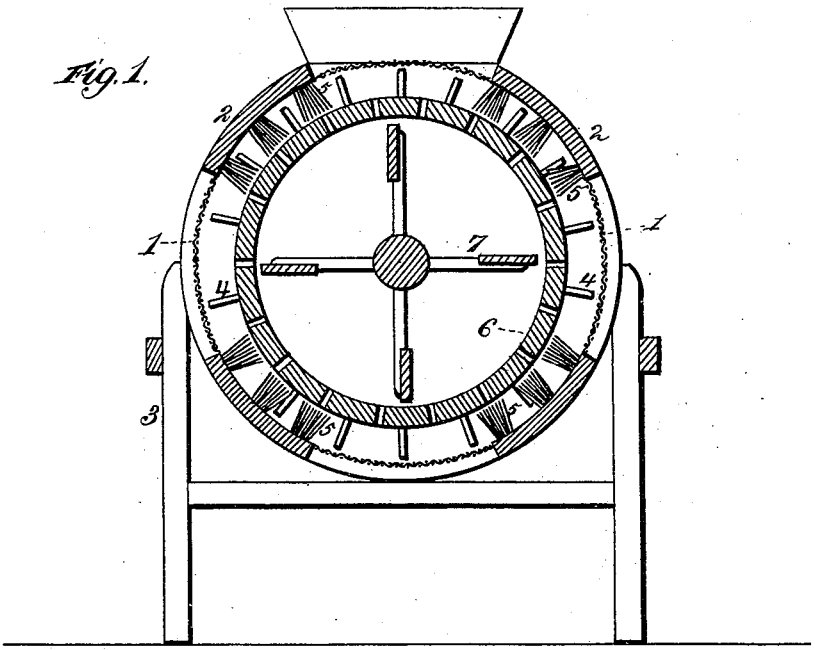
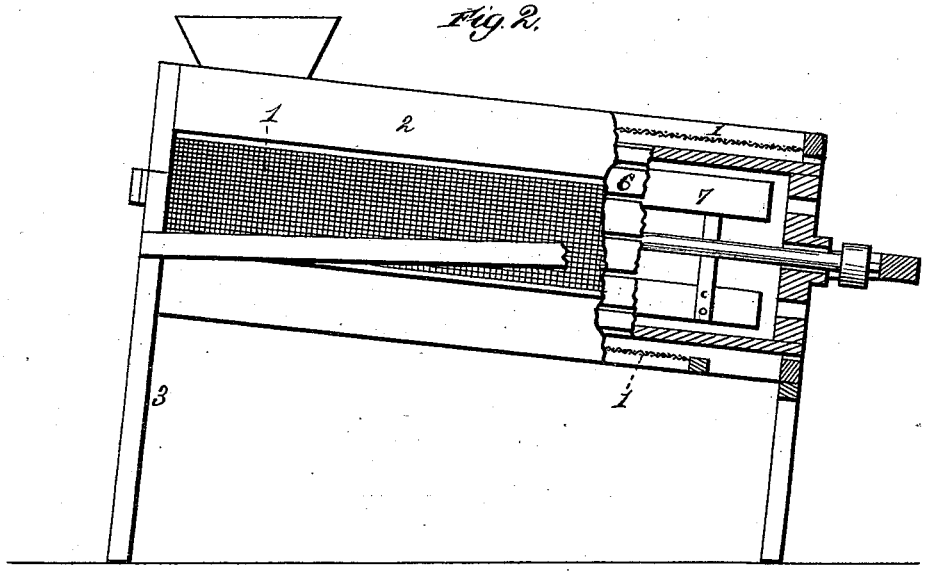
WITNESSES
INVENTOR
James F. Cunningham Sr.
By R. A. Burton
ATTORNEY
N. PETERS, PHOTO-LITHOGRAPHER, WASHINGTON, D C.

UNITED STATES PATENT OFFICE.

JAMES F. CUNNINGHAM, SR., OF SALEM, ARKANSAS.

MACHINE FOR CLEANING COTTON.

SPECIFICATION forming part of Letters Patent No. 236,700, dated January 18, 1881.

Application filed May 22, 1880. (No model.)

*To all whom it may concern:*

Be it known that I, JAMES F. CUNNINGHAM, Sr., a citizen of the United States, residing at Salem, in the county of Fulton and State of Arkansas, have invented certain new and useful Improvements in Machines for Cleaning Cotton; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in cotton-cleaners; and it consists in an inclined stationary wire-gauze cylinder provided with rows of bristles on its inner surface, and inclosing a smaller hollow revolving wooden cylinder with perforations or openings through its sides, and having projecting spikes on its exterior surface, and a fan arranged to rotate within its interior.

The outer cylinder is composed of wire-gauze with longitudinal strips 2, said cylinder being held stationary in a frame, 3. The meshes of this gauze cylinder are oblong and sufficiently large to permit the trash, but not the seed-cotton, to pass through and out. It may, however, be made of strips of wood arranged at suitable distances apart, instead of being made of wire-gauze. On the inner surface of this cylinder are rows of bristles 5 5. Instead of bristles, however, other flexible materials may be used. Within this outer cylinder is a cylinder, 6, which is provided with spikes 4 4 on its outer surface, and which will revolve slowly. The inner barrel or cylinder has passages for the air to pass out through it into the outer cylinder, passing through the cotton which occupies the space between.

The cotton feeds itself in at the upper and out at the lower end of the space between the two cylinders, and is thoroughly agitated by the spikes and bristles. An air-blast will be created in the inner cylinder by a fan, 7, and then forced out through the cotton into the outer cylinder, thus blowing the trash out through the gauze. After the cotton has been thoroughly submitted to this process it is discharged at the lower end on the breast of the gin.

Having thus described my invention, what I claim, and desire to secure by Letters Patent, is—

1. The cotton-cleaner comprising a gauze cylinder, an interior wooden revolving cylinder provided with air-passages, spikes and brushes between the two cylinders, and a fan arranged to rotate within the inner cylinder to force the air out through the cotton and both cylinders, substantially as set forth.

2. The combination of the inclined wire-gauze cylinder in a cotton-cleaner, with the inner revolving cylinder 6, the fan 7, and agitators between the two cylinders consisting of spikes and bristles or other flexible material, substantially as set forth.

In testimony whereof I affix my signature in presence of two witnesses.

JAMES F. CUNNINGHAM, SR.

Witnesses:
BENJ. H. CASTLEBERRY,
WALTER P. RHEA.